United States Patent
Bae et al.

(10) Patent No.: US 11,721,446 B2
(45) Date of Patent: Aug. 8, 2023

(54) SYSTEM FOR SENSING UF6 GAS LEAK IN NUCLEAR FUEL MANUFACTURING PROCESS

(71) Applicants: Youngmoon Bae, Daejeon (KR);
Seungchul Yang, Daejeon (KR);
Dongyong Kwak, Daejeon (KR);
Byungkuk Lee, Sejong (KR);
Hyunkwang Cho, Daejeon (KR);
Junho Lee, Daejeon (KR)

(72) Inventors: Youngmoon Bae, Daejeon (KR);
Seungchul Yang, Daejeon (KR);
Dongyong Kwak, Daejeon (KR);
Byungkuk Lee, Sejong (KR);
Hyunkwang Cho, Daejeon (KR);
Junho Lee, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 303 days.

(21) Appl. No.: 17/132,680

(22) Filed: Dec. 23, 2020

(65) Prior Publication Data

US 2021/0280328 A1 Sep. 9, 2021

Related U.S. Application Data

(63) Continuation of application No. PCT/KR2018/009388, filed on Aug. 16, 2018.

(30) Foreign Application Priority Data

Jun. 26, 2018 (KR) .................. 10-2018-0073540

(51) Int. Cl.
*G21C 17/00* (2006.01)
*G01M 3/20* (2006.01)
(Continued)

(52) U.S. Cl.
CPC ............. *G21C 17/002* (2013.01); *G01M 3/20* (2013.01); *G01M 3/38* (2013.01); *G21C 21/00* (2013.01); *C01G 43/063* (2013.01)

(58) Field of Classification Search
CPC ....... G21C 17/002; G21C 21/00; G01M 3/20; G01M 3/38; C01G 43/063
(Continued)

(56) References Cited

U.S. PATENT DOCUMENTS 6,136,285 A * 10/2000 Feugier .................. G21C 21/00
422/142
2008/0231719 A1 9/2008 Benson et al.

FOREIGN PATENT DOCUMENTS

JP S59-069433 A 4/1984
JP H1053419 A 2/1998
(Continued)

*Primary Examiner* — Jack W Keith
*Assistant Examiner* — Daniel Wasil
(74) *Attorney, Agent, or Firm* — Reinhart Boerner Van Deuren P.C.

(57) ABSTRACT

Disclosed is a system for sensing a $UF_6$ gas leak in a nuclear fuel manufacturing process. The system is configured to sense whether or not there is a $UF_6$ gas leak by optically detecting $UO_2F_2$ in a solid state generated due to a reaction with outside air. This allows prevention of damage to a detection apparatus by means of sensing in a non-contact manner whether or not there is a $UF_6$ gas leak. Further, the system extends the mechanical life of and reduces the maintenance and repair costs for the detection apparatus.

4 Claims, 5 Drawing Sheets

(51) Int. Cl.
*G01M 3/38* (2006.01)
*G21C 21/00* (2006.01)
*C01G 43/06* (2006.01)

(58) Field of Classification Search
USPC .......................................................... 376/250
See application file for complete search history.

(56) References Cited

FOREIGN PATENT DOCUMENTS

| | | | |
|---|---|---|---|
| JP | 2000219516 A | 8/2000 |
| JP | 2004028463 A | 1/2004 |
| JP | 2013007697 A | 1/2013 |
| KR | 1020080037793 A | 5/2008 |
| KR | 1020120094675 A | 8/2012 |
| KR | 1020150067425 A | 6/2015 |
| KR | 101548973 B1 | 8/2016 |
| KR | 101648973 B1 | 8/2016 |
| KR | 101856467 B1 | 5/2018 |
| WO | 2018/008790 A2 | 11/2018 |
| WO | WO 2018/008790 A2 | 11/2018 |

* cited by examiner

SYSTEM FOR SENSING UF6 GAS LEAK IN NUCLEAR FUEL MANUFACTURING PROCESS

CROSS-REFERENCE TO RELATED PATENT APPLICATIONS

This patent application is a continuation of International Application No. PCT/KR2018/009388, filed on Aug. 16, 2018, which claims the benefit of priority to Korean Patent Application No. 10-2018-0073540 filed Jun. 26, 2018, the entire teachings and disclosures of both applications are incorporated herein by reference thereto.

TECHNICAL FIELD

The present disclosure relates to a system for sensing a $UF_6$ gas leak in a nuclear fuel manufacturing process. More specifically, the present disclosure relates to a system for sensing a $UF_6$ gas leak in a nuclear fuel manufacturing process, which is capable of sensing whether or not there is a $UF_6$ gas leak by optically detecting $UO_2F_2$ in a solid state generated due to a reaction with outside air when $UF_6$ gas leaks inside a $UF_6$ autoclave.

BACKGROUND ART

A reconversion process in a light water reactor fuel manufacturing process begins with a vaporization process, which is a unit process that converts solid $UF_6$ (uranium hexafluoride) into a gaseous state.

$UF_6$ is filled in a solid state in a cylinder and then stored in a reconversion plant, thereby being vaporized in the vaporization process and then introduced into a subsequent unit process such as a conversion process (for example, the case of a dry conversion (DC) process or an integrated dry route (IDR) process), a precipitation process (for example, the case of a ammonium uranyl carbonate (AUC) process), or a hydrolysis process (for example, the case of an ammonium uranate hydrate (AUH) process or an ammonium diuranate (ADU) process).

Figure 1:
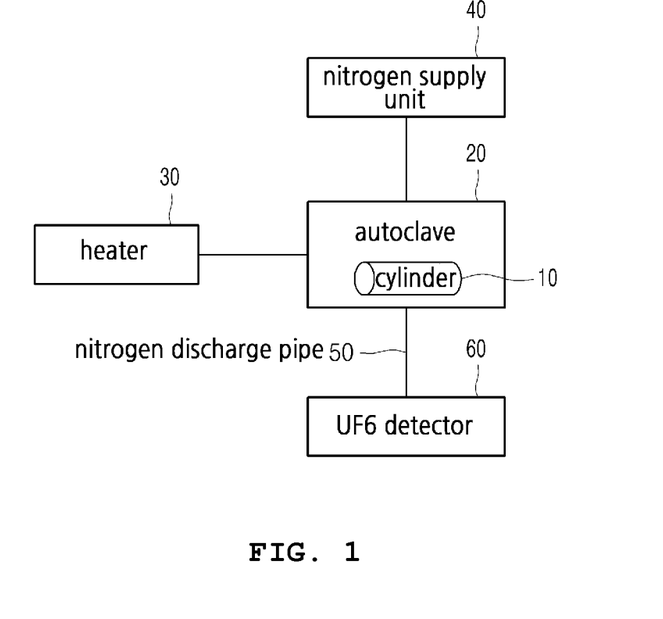
FIG. 1 is a view showing a configuration of a $UF_6$ vaporization process in a nuclear fuel manufacturing process.

In the vaporization process, as shown in FIG. 1, after charging a cylinder 10 filled with $UF_6$ into an autoclave 20, and connecting the $UF_6$ gas transfer pipe (not shown) to the cylinder 10, an inside of the autoclave 20 is heated to about 115° C. to vaporize $UF_6$, and $UF_6$ is transferred to a reaction unit (not shown) in a subsequent process.

At this time, nitrogen gas is introduced into the autoclave 20 through a nitrogen supply pipe from a nitrogen supply unit 40, and the nitrogen gas is heated by the heater 30 to heat the cylinder 10 and then discharged through a nitrogen discharge pipe 50.

When $UF_6$ leaks to out of the cylinder 10, the pipe, or process facilities during this process, it has a significant impact on safety of workers and the facilities due to generation of hydrogen fluoride (HF) that is a very toxic material in addition to uranium that is not only a radioactive material but also heavy metal.

That is, when $UF_6$ leaks and is exposed to the air, it reacts with water vapor in the air as follows to produce uranyl fluoride ($UO_2F_2$) or uranium oxyfluoride ($F_2OU$), and hydrogen fluoride (HF).

In addition, $UO_2F_2$ dissolves rapidly upon contact with water and generates HF as follows.

A $UF_6$ detector 60 configured to sense a leakage of $UF_6$ in the vaporization process is installed at the nitrogen discharge pipe 50 and is able to sense whether $UF_6$ leaks by sensing HF generated through the above reaction equations.

That is, in the case of a leak of $UF_6$ inside the autoclave 20, the gas discharged through the nitrogen discharge pipe 50 reacts when passing through the $UF_6$ detector 60 with outside air that is injected into the $UF_6$ detector 60 to generate HF. At this time, the $UF_6$ detector 60 senses HF so that the administrator may recognize whether the $UF_6$ leaks.

In this process, the above-described system for sensing a $UF_6$ gas leak has a problem in that since a sensor 61 of the $UF_6$ detector 60 directly contacts highly corrosive HF, the sensor 61 corrodes. In addition, the above-described system has a problem in that $UO_2F_2$ is also deposited on the sensor.

Figure 2:
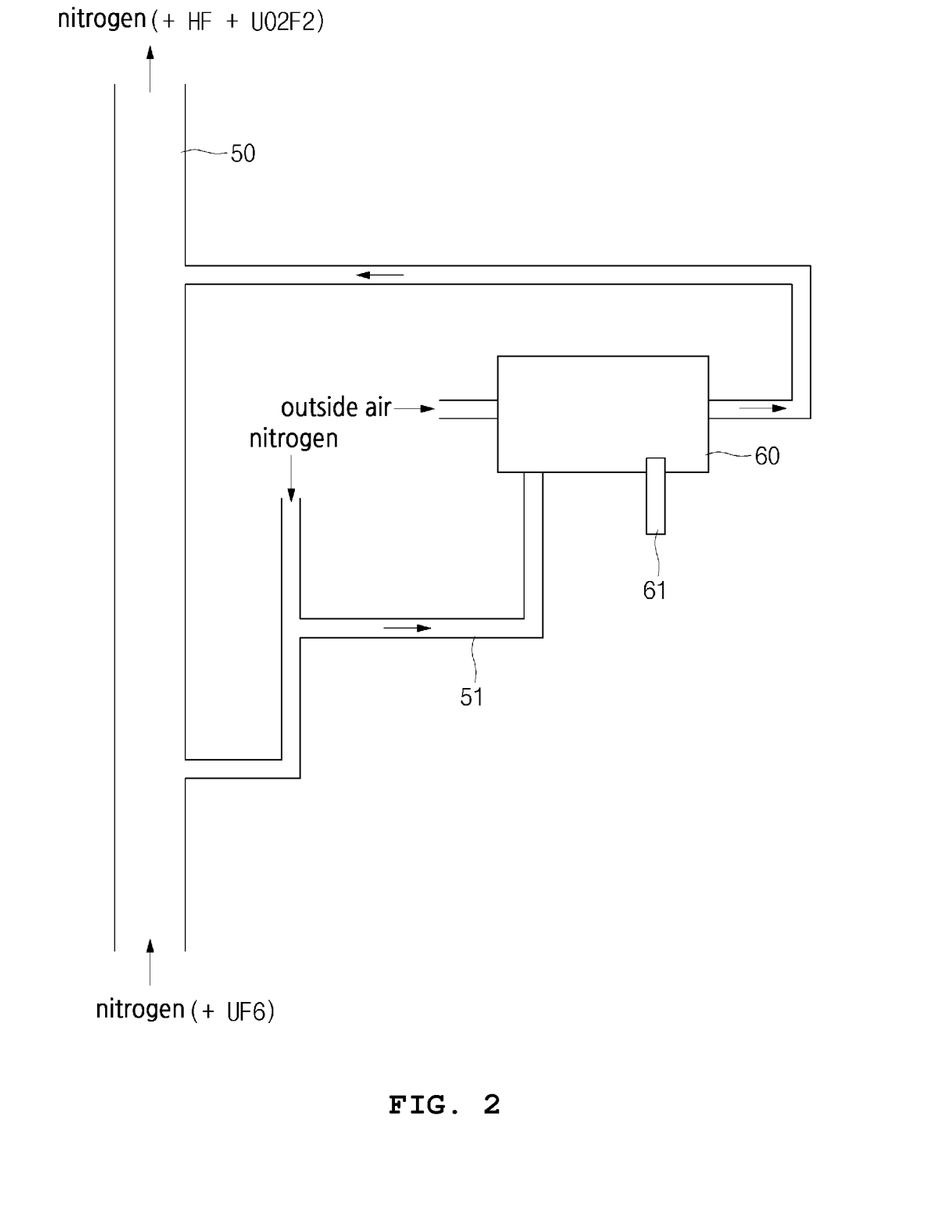
FIG. 2 is a view of a main part showing a detector for sensing whether $UF_6$ leaks in a $UF_6$ vaporization process in a nuclear fuel manufacturing process according to a related art.

In order to minimize such problems, as shown in FIG. 2, a bypass pipe 51 having an inner diameter smaller than an inner diameter of the nitrogen discharge pipe 50 is installed at the nitrogen discharge pipe 50, and the $UF_6$ detector 60 is installed at the bypass pipe 51. As a result, the flow of gas flowing into the $UF_6$ detector 60 may be minimized, thus minimizing damage to the $UF_6$ detector 60. However, there is a problem in that a structure becomes complicated because a separate nitrogen purge line is required to be built and the like.

In addition, there is a problem that the conduit of the bypass pipe 51 is narrow, whereby the conduit is blocked due to $UO_2F_2$.

In addition, since the gas discharged through the nitrogen discharge pipe 50 is a high-temperature gas having heated the cylinder 10, there are problems that the gas causes a failure of the sensor 61 of the $UF_6$ detector 60 and shortens a life time of the sensor 61.

Accordingly, there is a problem in that the maintenance of the $UF_6$ detector 60 is troublesome and the maintenance cost is increased.

In order to resolve such problems, a method of allowing the gas discharged through the nitrogen discharge pipe 50 to react with water is also proposed, but the problem of the sensor 61 being corroded is not resolved, and there is a problem in that radioactive liquid waste ($UO_2F_2$ aqueous solution) is generated.

DOCUMENTS OF RELATED ART (Patent Document)
Korean Patent No. 10-1227807

BRIEF SUMMARY

Accordingly, the present disclosure has been made keeping in mind the above problems occurring in the related art, and an objective of the present disclosure is to provide a system for sensing a $UF_6$ gas leak in a nuclear fuel manufacturing process, wherein, in the case of a leakage of a $UF_6$ gas, the system allows $UF_6$ to react with $UO_2F_2$ and HF by mixing outside air with the gas discharged through a nitrogen discharge pipe and senses whether $UF_6$ gas leaks by measuring $UO_2F_2$ particles, a reaction product, in a non-contact manner. As a result, the system can prevent sensor failure and reduce a maintenance cost of the detector.

In order to accomplish the above objective, the present disclosure may provide a system for sensing a $UF_6$ gas leak in a nuclear fuel manufacturing process, the system including: an autoclave provided with a cylinder, charged with uranium hexafluoride ($UF_6$) in a solid state, disposed therein and with a nitrogen supply pipe and a nitrogen discharge pipe, through which nitrogen inflow and nitrogen discharge are accomplished, installed on one side and an opposite side, respectively, and vaporizing the $UF_6$ inside the cylinder through heating the nitrogen inside the autoclave; and a detection unit configured to sense whether the $UF_6$ is mixed with the nitrogen discharged after circulating inside the autoclave, thereby sensing whether the $UF_6$ leaks inside the autoclave, wherein the detection unit generates $UO_2F_2$ and HF by allowing $UF_6$ to react with outside air and comprises a measuring instrument, and optically sense the generated $UO_2F_2$ particles in a solid state, to allow non-contact $UF_6$ leak detection to be made.

At this time, the detection unit may include: an outside air injection pipe configured to inject outside air to be mixed with nitrogen, which is discharged from the autoclave to the nitrogen discharge pipe; and the measuring instrument configured to sense $UO_2F_2$ generated when the $UF_6$ leaks.

In addition, the nitrogen discharge pipe may be provided with a filter configured to filter out the $UO_2F_2$ having passed through the detection unit.

In addition, the nitrogen discharge pipe may be provided with an HF sensor configured to sense the HF having passed through the detection unit.

In addition, the measuring instrument may be a device configured to optically sense particles floating in the air.

A system for sensing a $UF_6$ gas leak in a nuclear fuel manufacturing process according to the present disclosure has the following effects.

First, there is an effect of simplifying a configuration of the system for sensing a $UF_6$ gas leak by omitting a complicated configuration such as a bypass pipe and the like.

Second, since there is no need for direct contact between the gas discharged from an autoclave and a detection device (measuring instrument), there is an effect of preventing damage to the detection device even when there is a leak of $UF_6$ gas.

That is, the system is anon-contact type that senses $UF_6$ leakage by optically sensing solid particles of $UO_2F_2$ generated through the reaction between $UF_6$ and outside air, so damage to the detection device due to corrosion and high temperature can be prevented so that a mechanical life time of the detection device can be extended, whereby there is an effect of reducing maintenance cost.

DETAILED DESCRIPTION

Terms and words used in present specification and claims are not limited to a conventional or dictionary meaning and should be interpreted as having a meaning and concept consistent with the technical idea of the present disclosure on the basis of the principle that an inventor may appropriately define a concept of terms in order to describe the disclosure in the best way.

Hereinafter, a system for sensing a $UF_6$ gas leak in a nuclear fuel manufacturing process according to an exemplary embodiment of the present disclosure will be described with reference to FIGS. 3 and 4.

Prior to the description, since a configuration and an operation of an autoclave 20 is a well-known technology, a detailed illustration and description will be omitted.

Figure 3:
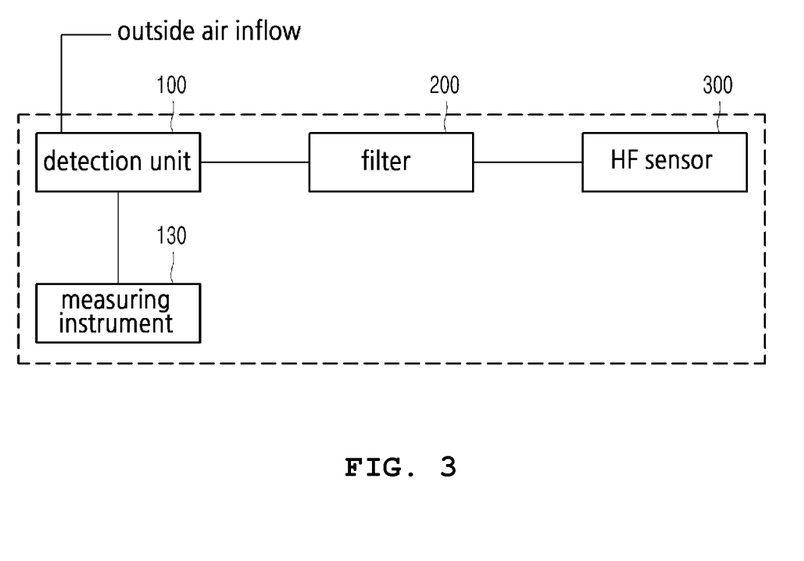
FIG. 3 is a view showing a main part of a system for sensing a $UF_6$ gas leak in a nuclear fuel manufacturing process according to an exemplary embodiment of the present disclosure.
Figure 4:
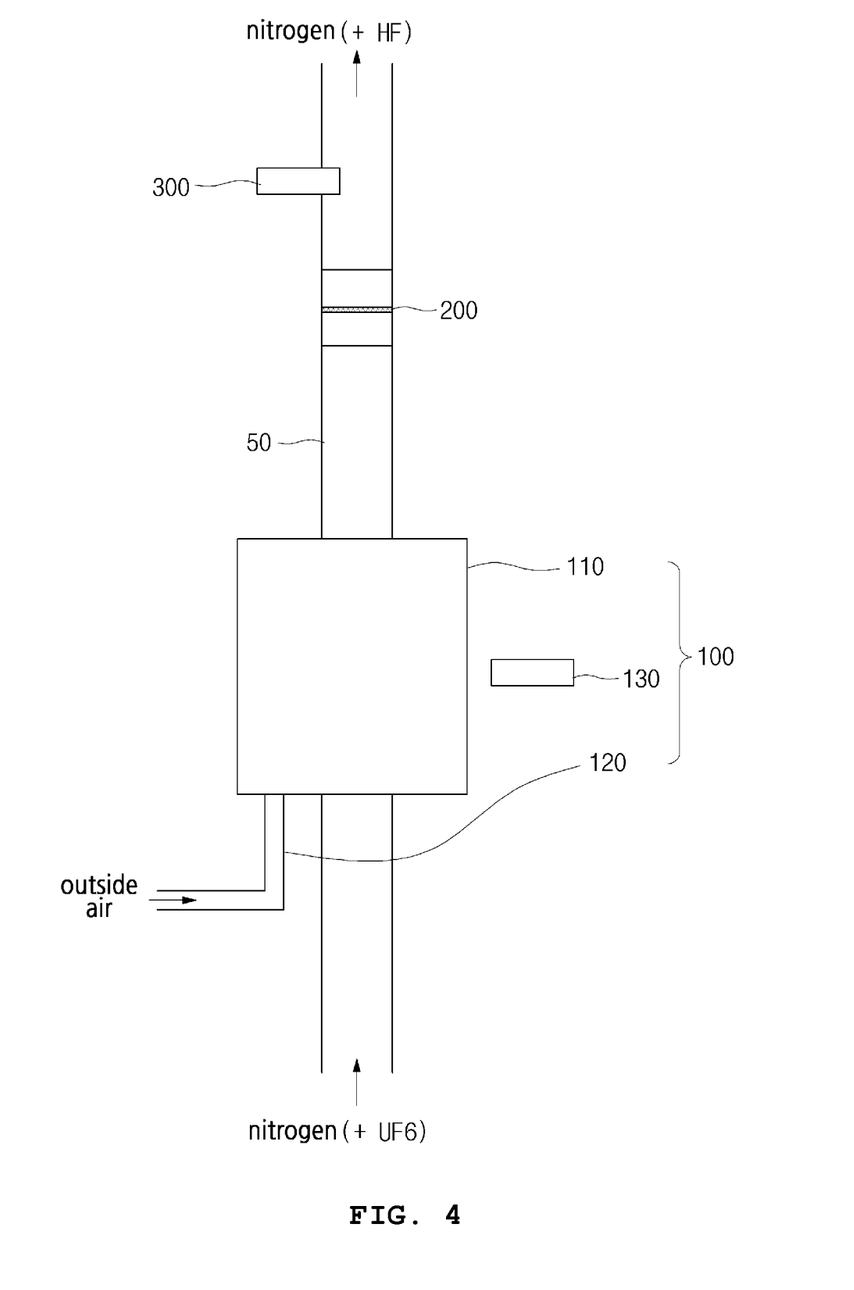
FIG. 4 is a view showing a configuration of the system for sensing a $UF_6$ gas leak in the nuclear fuel manufacturing process according to the exemplary embodiment of the present disclosure.

The system for sensing a $UF_6$ gas leak in the nuclear fuel manufacturing process is configured, as shown in FIGS. 3 and 4, to include a detection unit 100 and a filter 200 and may include an HF sensor 300.

The detection unit 100 serves to sense in a non-contact manner whether $UF_6$ is contained in nitrogen discharged from the autoclave 20 and is installed at a nitrogen discharge pipe 50.

The detection unit 100 may be installed at a main pipe of the nitrogen discharge pipe 50 as shown in FIG. 4.

As the detection unit 100 is installed at the nitrogen discharge pipe 50, nitrogen discharged through the nitrogen discharge pipe 50 is discharged via the detection unit 100.

The detection unit 100 may allow the nitrogen discharged from the autoclave 20 to react with the outside air, thereby sensing whether or not $UF_6$ leaks.

That is, when $UF_6$ is contained in the gas discharged through the nitrogen discharge pipe 50, the $UF_6$ generates $UO_2F_2$ and HF while reacting with outside air in the detection unit 100.

To this end, the detection unit 100 includes a reaction unit 110 providing a reaction space, an outside air injection pipe 120, which is a conduit through which injection of the outside air into the reaction unit 110 is accomplished, and a measuring instrument 130 for measuring $UO_2F_2$ reacted in the reaction unit 110.

The reaction unit 110 provides a space in which reaction of nitrogen and the outside air is accomplished in the process of discharging the high-temperature nitrogen discharged from the autoclave 20 through the nitrogen discharge pipe 50 as described above and is installed at the nitrogen discharge pipe 50.

In this case, an outside air injection pipe 120 is installed at the reaction unit 110 so as to allow the outside air to be injected into the reaction unit 110 for the reaction of $UF_6$.

In addition, the measuring instrument 130 serves to measure the $UO_2F_2$ generated while the reaction is accomplished in the reaction unit 110.

For the leakage of $UF_6$ gas, while the sensor 61 electronically senses HF that is in a gaseous state conventionally, the present disclosure provides a technical configuration for optically measuring $UO_2F_2$ that is in a solid state.

That is, in the reaction unit 110, $UO_2F_2$, which is solid particles in a form of fumes, and liquid HF are generated through the reaction of $UF_6$ with outside air. At this time, by optically measuring the solid $UO_2F_2$, it is possible to sense whether $UF_6$ gas leaks.

In this case, the reaction unit 110 is provided of a transparent material so that an inside of the reaction unit 110 may be seen, and the measuring instrument 130 may be installed outside the reaction unit 110.

Accordingly, the measuring instrument 130 may sense whether the $UF_6$ leaks from the outside of the reaction unit 110 without contacting the material generated in the reaction unit 110.

The measuring instrument 130 may be provided as a device for optically sensing particles floating in the air.

For example, the measuring instrument 130 may be provided as a floating particle counter or a photosensor.

Next, the filter 200 serves to filter out the $UO_2F_2$ discharged through the nitrogen discharge pipe 50, thereby preventing the conduit of the nitrogen discharge pipe 50 from being blocked.

That is, when $UF_6$ is contained in the nitrogen discharged through the nitrogen discharge pipe 50, the conduit of the nitrogen discharge pipe 50 may be blocked by the $UO_2F_2$ due to the generation of $UO_2F_2$, so $UO_2F_2$ is filtered through the filter 200, whereby the conduit of the nitrogen discharge pipe 50 is prevented from being blocked.

Accordingly, even when there is a leak of $UF_6$, $UO_2F_2$ particles pass through the detection unit 100 and are filtered by the filter 200, and only nitrogen and HF are discharged passing through the filter 200.

Next, the HF sensor 300 serves to sense the HF passing through the filter 200.

The HF sensor 300 plays an auxiliary role in sensing whether $UF_6$ leaks.

That is, the present disclosure optically senses $UO_2F_2$ particles through the measuring instrument 130, but when installation of the HF sensor 300 is parallelly established, even when a malfunction or failure of the measuring instrument 130 occurs, it may sense whether $UF_6$ leaks through the HF sensor 300.

Hereinafter, a process of sensing a $UF_6$ leak is accomplished by the system for sensing a $UF_6$ gas leak in the nuclear fuel manufacturing process configured as described above will be described with reference to FIG. 5.

Figure 5:
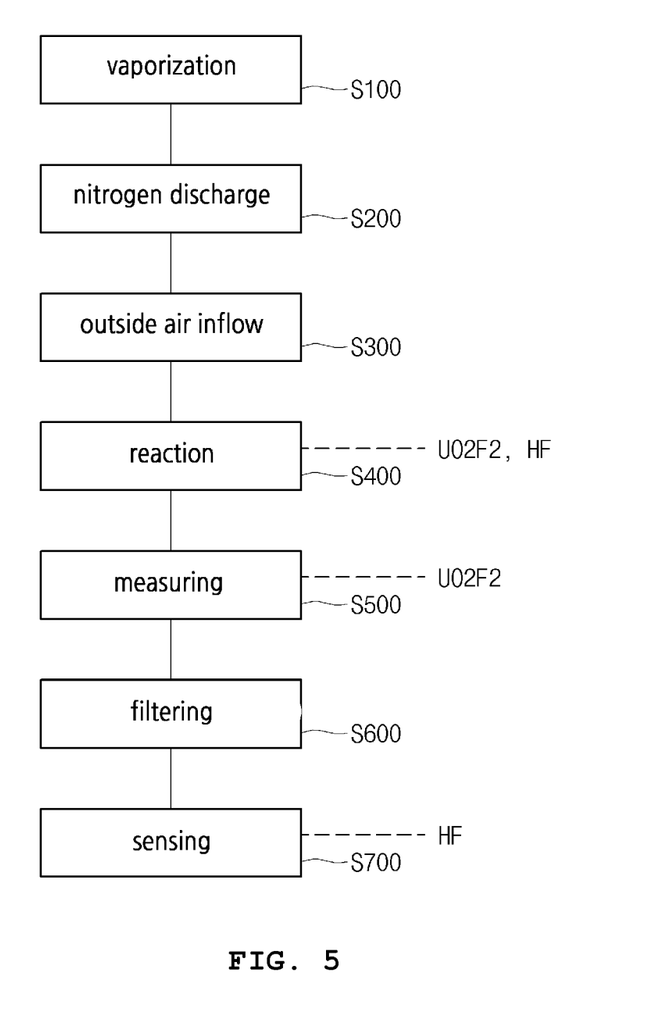
FIG. 5 is a flow chart showing a process in which detection of $UF_6$, generated during the nuclear fuel manufacturing process according to the exemplary embodiment of the present disclosure, is accomplished through the system for sensing a $UF_6$ gas leak.

The vaporization process is performed in S100 through the autoclave 20 of the nuclear fuel reconversion process.

Nitrogen is introduced into the autoclave 20, and the nitrogen heated by the heater 30 heats the cylinder 10 filled with solid $UF_6$ to vaporize $UF_6$.

Thereafter, the gas vaporized in the cylinder 10 is transferred to a subsequent process.

Next, the nitrogen that heated the cylinder 10 while circulating in the autoclave 20 is discharged in S200 through the nitrogen discharge pipe 50.

At this time, the nitrogen is discharged through the reaction unit 110 of the detection unit 100 whereas the outside air is introduced into the reaction unit 110 in S300 through the outside air inlet pipe 120.

Accordingly, the outside air and nitrogen are mixed in the reaction unit 110.

At this time, when $UF_6$ leaks and being discharged with nitrogen together, $UO_2F_2$ and HF are generated in S400 through the above-described reaction equations.

At this time, $UO_2F_2$ is a particle in a solid state and is sensed in S500 through the measuring instrument 130 installed outside the reaction unit 110.

In this way, when $UO_2F_2$ is sensed through the measuring instrument 130, the administrator is able to quickly recognize it through an alarm or light emission of warning light to perform a series of post-processing.

Meanwhile, the $UO_2F_2$ and HF reacted in the reaction unit 110 are continuously discharged along the nitrogen discharge pipe 50.

At this time, $UO_2F_2$ is filtered out in S600 through the filter 200, and nitrogen and HF are discharged through the filter 200.

At this time, the HF sensor 300 senses in S700 the HF transferred through the nitrogen discharge pipe 50 and let the manager recognize it.

When the $UO_2F_2$ is detected through the measuring instrument 130, the HF will be detected also through the HF sensor 300.

Even when the $UO_2F_2$ is not detected due to the failure of the measuring instrument 130, the $UF_6$ detection error does not occur as the HF sensor 300 senses the HF.

Hereby, the process of sensing the $UF_6$ leak is completed.

As described so far, the system for sensing a $UF_6$ gas leak according to the present disclosure may sense whether $UF_6$ leaks through the optical detection of the $UO_2F_2$ by generating the $UO_2F_2$ particles in a solid state through the reaction with the outside air.

As the $UF_6$ leak detection is performed through such a non-contact method, damage to the detection apparatus may be prevented, and the maintenance cost of the detection apparatus may be reduced.

In the above, the present disclosure has been described in detail with respect to the described embodiments, but it is obvious to those skilled in the art that various alterations and modifications are possible within the scope of the technical idea of the present disclosure. In addition, it is natural that such alterations and modifications are included in the appended claims.

<Description of the Reference Numerals in the Drawings>

| | |
|---|---|
| 100: detection unit | 110: reaction unit |
| 120: outside air injection pipe | 130: measuring instrument |
| 200: filter | 300: HF sensor |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for sensing a UF6 gas leak in a nuclear fuel manufacturing process, the system comprising:
    an autoclave connected to a nitrogen supply pipe installed on one side of the autoclave and to a nitrogen discharge pipe installed on an opposite side of the autoclave, nitrogen inflow and nitrogen discharge being provided through the nitrogen supply pipe and the nitrogen discharge pipe, respectively,
    a cylinder charged with uranium hexafluoride ($UF_6$) in a solid state, the cylinder being disposed in the autoclave, wherein the autoclave vaporizes the $UF_6$ inside the cylinder through heating the nitrogen inside the autoclave; and
    a detection unit, the detection unit configured to sense whether the $UF_6$ is mixed with the nitrogen discharged after circulating inside the autoclave, thereby sensing whether the $UF_6$ leaks inside the autoclave, and the detection unit configured to generate $UO_2F_2$ particles and HF by allowing the $UF_6$ to react with outside air;
    wherein the detection unit comprises an outside air injection pipe for injecting the outside air into the detection unit and a measuring instrument for optically sensing the $UO_2F_2$ particles in a solid state generated by reacting the outside air with the $UF_6$, thereby allowing non-contact $UF_6$ leak detection to be made.

2. The system of claim 1, wherein the nitrogen discharge pipe is provided with a filter configured to filter out the $UO_2F_2$ particles generated in the detection unit.

3. The system of claim 1, wherein the nitrogen discharge pipe is provided with an HF sensor configured to sense the HF having generated in the detection unit.

4. The system of claim 1, wherein the measuring instrument is a device configured to optically sense particles floating in the air in the detection unit.

* * * * *